10-23-73 CR 3,767,290

United States Patent [19]

Lang et al.

[11] 3,767,290

[45] Oct. 23, 1973

[54] BEAM SPLITTING PRISM SYSTEM FOR COLOR TELEVISION

[75] Inventors: Heinwig Lang; Fritz Laschat, both of Darmstadt, Germany

[73] Assignee: Fernseh GmbH, Darmstadt, Germany

[22] Filed: Apr. 9, 1971

[21] Appl. No.: 132,762

[30] Foreign Application Priority Data

Apr. 17, 1970 Germany .................. P 20 18 397.5

[52] U.S. Cl. .................. 350/173, 350/152, 350/157

[51] Int. Cl. .................. G02b 27/14

[58] Field of Search .................. 350/169, 170, 286, 350/172, 173, 152, 157; 315/11; 178/5.4 BD

[56] References Cited

UNITED STATES PATENTS 3,497,283 2/1970 Law .................. 350/169

3,527,523 9/1970 Travis .................. 350/171

3,610,818 10/1971 Bachmann .................. 350/173

*Primary Examiner*—David Schonberg

*Assistant Examiner*—Michael J. Tokar

*Attorney*—Littlepage, Quaintance, Wray & Aisenberg

[57] ABSTRACT

Light is divided into three spectral ranges. A first range passes through a dichroic coating separating doublé prisms. A second range is reflected. A third range is partially reflected and partially transmitted according to polarization. Quarter wave plates change polarization as dichroic coatings at faces of the prisms reflect the third range back into the prisms. Previously transmitted third range light is reflected at the prism interface, and previously reflected third range light is transmitted, recombining the third range. Filters at the prism exit faces remove unwanted light.

4 Claims, 5 Drawing Figures

2 Sheets-Sheet 1

Inventors:
Dr. Heinwig Lang
Fritz Laschat
by James Wray
Attorney

Inventors:
Dr. Heinwig Lang
Fritz Laschat
by James Wray
Attorney

BEAM SPLITTING PRISM SYSTEM FOR COLOR TELEVISION

BACKGROUND OF THE INVENTION

The invention relates to a beam splitting prism system for a device in the color television art, in particular for a color television camera, for splitting an incident light beam into partial light beams in different spectral regions.

It is known per se, for the purpose of splitting beams, to use prism systems in which, by means of dichroic, polarizing and doubly refractive coatings, the light passed to the prism system is split up into light beams in different spectral regions.

However, in the beam splitting prism systems previously available in the color television art, either the degree of optical efficiency is not satisfactory in some spectral regions, or the prism arrangements require a relatively large amount of space, which is particularly a disadvantage in easily transportable color television cameras.

SUMMARY OF THE INVENTION

The invention seeks, by means of a novel arrangement of prisms, doubly refractive coatings and dichroic coatings, while avoiding the above described disadvantages, to provide a relatively small beam splitting prism system which has a high degree of optical efficiency, that is to say, low losses, in all spectral regions which are of importance for color television transmission.

Surprisingly, it has been found that in dichroic coatings the properties which were previously considered disadvantageous, advantageously are exploited when used in beam splitting prism systems which are distinguished by high degrees of optical efficiency in all spectral regions which are of importance for color television transmission. The transmitting of one part of the light and reflecting the other part, at an incidence angle of about 30° to 50° in glass, depending on the orientation of the polarization planes, is useful in spectral division.

A beam splitting prism system constructed in accordance with the present invention has a high degree of optical efficiency and has a compact arrangement. A first beam splitting prism has an input face which adjoins the air, and which receives the light from an object. A first output face has a dichroic coating for dividing the light beam into two partial light beams. The dichroic coating is such that the light in one spectral region is transmitted; the light in a second spectral region is reflected, and the light in a third spectral region is partly transmitted and partly reflected, depending on the orientation of the polarization plane of the incident light relative to the incidence plane. A second beam splitting prism has an input face which borders the first output face of the first beam splitting prism. The second output face of the first beam splitting prism and the first output face of the second beam splitting prism each have a doubly refractive coating and each have therebehind, seen in the direction of the beam, a dichroic coating. The dichroic coating of the second output face of the first beam splitting prism is such that it substantially transmits the portion of light in a first spectral region, which is reflected at the first dichroic coating, and substantially reflects the portion of partly reflected light in a third spectral region. The dichroic coating of the first output face of the second beam splitting prism is such that it substantially transmits the portion of light in a second spectral region which is transmitted by the first dichroic coating, and substantially reflects the portion of partially transmitted light in the third spectral region. The doubly refractive coatings at the second output face of the first color splitting prism and at the first output face of the second color splitting prism are such that the polarization planes of the portions of light in the third spectral region, which portions are reflected by the dichroic coatings at the output faces of the beam splitting prism system, are turned through 90°, passing twice through the doubly refractive coating.

The rotation of the polarization planes provides that the portion of light in the third spectral region, which portion is reflected by the first dichroic coating at the first passage, is transmitted, after this rotation, by the first dichroic coating, and the portion transmitted at the first passage is reflected.

It is known that the spectral transmissivity and reflection of dichroic coatings depends on the incidence angle and also, with incident angles which differ from 0°, varies for light of different polarization directions.

It is also known that dichroic coatings which, with an incidence angle of 0°, have high transmissivity in one part of the spectral region and high reflection in the remaining spectral region, the transition occurring in a narrow spectral region, have the same properties at larger incidence angles. However, the flanks of the spectral transmissivity curves for the two polarization directions of the incident light lie in different spectral regions and move further away from each other with increasing incidence angle.

Starting from this known prior art, it was recognized that these properties of dichroic coatings, which were previously considered disadvantageous, can be used to produce a simple beam splitter which has a high degree of efficiency in all spectral regions which are of importance for the color television art.

It was found that, for a given dichroic coating which, with an incidence angle of 0°, is reflecting for light below 650 nm wave length and is transmissive above 650 nm wave length, with an incidence angle of 45° in glass the side is displaced for light polarized perpendicularly to the incidence plane to about 55 nm and for light polarized parallel to the incidence plane, to about 485 nm.

Therefore, with this arrangement, the coating is blue reflecting for light polarized parallel to the incidence plane, and is red transmissive for light polarized perpendicularly to the incidence plane. In the green spectral region, this coating is reflecting for light polarized perpendicularly to the incidence plane, and is transmissive for light polarized parallel to that plane.

The sides of the curves of spectral transmissivity for a coating which, with an incidence angle of 0°, is transmissive for light with a wave length <640 nm and is reflecting for light with a wave length >640 nm, are accordingly moved, with a 45° incidence angle in glass, to 565 nm for light which is polarized parallel to the incidence plane, and to 505 nm for light which is polarized perpendicularly to the incidence plane. Therefore, with a 45° incidence angle, this coating is red-reflecting for light which is polarized parallel to the incidence plane, and is blue transmissive for light which is polarized perpendicularly to the incidence plane, while, depending on the direction of polarization, the green spectral region is again reflected or transmitted.

The dichroic coating in the separating plane between two part prisms is therefore advantageously such that, when the color portions are separated, either the coating reflects the light of the blue spectral region as completely as possible and transmits the light in the red spectral region, or the coating reflects the light in the red spectral region as completely as possible and transmits the light in the blue spectral region. With that arrangement in each case, the coating reflects the portion of light in the green spectral region which is polarized in one plane, and transmits the portion of light in the green spectral region which is polarized in the other plane. In this way, there is precise separation of the red and blue partial light beams in one separation plane.

In a preferred embodiment, the plane of the dichroic coating between the two part prisms extends at an angle of 45° in glass to the primary optical axis.

This arrangement provides a particularly simple beam path which, by short glass-traversing paths, leads to short intercept lengths.

A further essential feature of the invention is that the doubly refractive coatings at the second output face of the first beam splitting prism and at the first output face of the second beam splitting prism are so-called quarter-wave plates, relative to the wave length of the green light beam. The arrangement of these doubly refractive coatings at the two output faces for the red and blue light beams respectively provides that the portions of the green light beam which are reflected by the dichroic coatings arranged on the doubly refractive coatings are reversed in polarization at the second passage in such a way that the portion which was reflected by the dichroic coating in the plane between two part prisms is now transmitted, and the portion which was transmitted at the first passage is now reflected. In this way, both partial light beams in the green spectral region are joined and directed to the storage tube or photoelectric cathode provided for recording the green portion. In this way, when using the beam splitting prism system according to the invention in film scanning means, it is possible for the photoelectric cathodes for the three main spectral regions to be arranged directly in front of the output faces of the prism system, and thereby to achieve an extremely compact arrangement. Also, when using the beam splitting prism system according to the invention in color camera, the storage tubes may be arranged with a minimum of glass-traversing paths around the beam splitting prism system. In this case, two of the three tubes can advantageously be arranged parallel to each other, with the third tube at a right-angle thereto. The resulting color camera is distinguished by an extremely short structural length and small height.

To filter out undesired spectral regions, it is frequently necessary to provide per se known correction filters which are not a subject of the invention, at the output faces of the prism system.

One object of this invention is to separate colors from a light beam with a compact prism system having a dichroic coated interface.

Another object of this invention is the provision of a compact beam splitting optical method and apparatus having first and second prisms with a dichromic coated interface and having quarter wave plates and dichroic coatings at first and second color outputs to reflect and change polarization of light in a third color spectral range for reflecting previously partially transmitted third color and for transmitting previously partially reflected third color at the prism interface to combine the third color at a separate output.

These and other advantages of the invention are apparent in the disclosure which is the foregoing and ongoing specification, including the claims and the drawings.

BRIEF DESCRIPTION OF THE DRAWINGS

The invention is explained and described hereinafter in greater detail with reference to the drawings, in which.

DETAILED DESCRIPTION OF THE DRAWINGS

Figure 1:
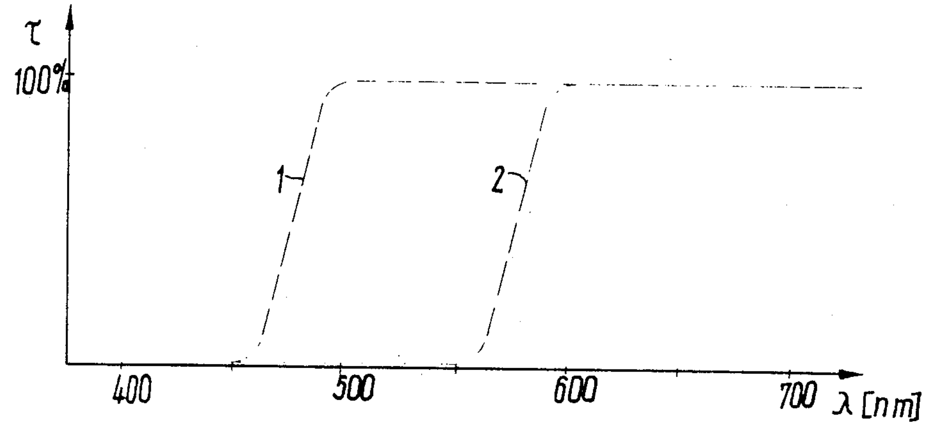
FIG. 1 shows the diagrammatic transmission curves of a dichroic coating with a 45° incidence angle in glass, which reflects in the blue spectral region, transmits in the red and polarizes in the green.

In FIG. 1, the curves 1 and 2 are, for example, ideal curves of spectral transmissivity for a dichroic filter, with an incidence angle of 45° in glass. The curve 1 shows the transmissivity for different wave lengths in the case of light which is polarized parallel to the incidence plane. The curve 2 shows in the same manner the spectral transmissivity in the case of light which is polarized perpendicularly to the incidence plane.

Figure 2:
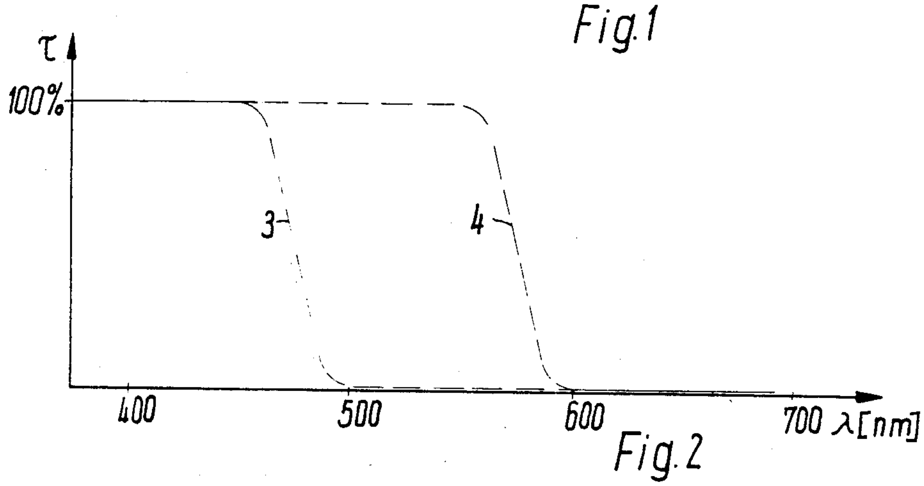
FIG. 2 shows the diagrammatic transmission curves of a dichroic coating with a 45° incidence angle in glass, which transmits in the blue spectral region, reflects in the red and polarizes in the green.

FIG. 2 shows the curves of spectral transmissivity for a dichroic coating which has the highest degree of transmissivity for light in the blue spectral region, and which reflects light in the red spectral region. The curve 3 in FIG. 2 applies to light which is polarized perpendicularly to the incidence plane. The curve 4 applies to light which is polarized parallel to the incidence plane. In this case also the incidence angle is again 45° in glass.

With both dichroic coatings, for light in the green spectral region between 500 and 550 nm wave length, there is a separation of the green light beam, depending on the direction of polarization.

Figure 3:
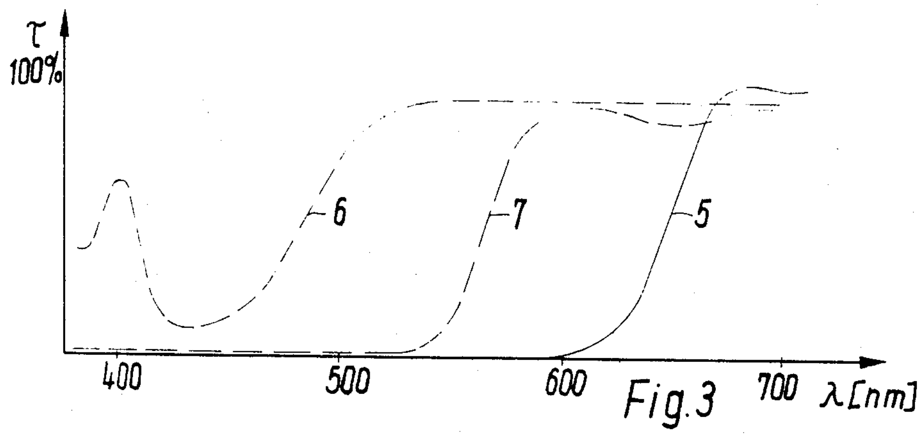
FIG. 3 shows the curves of spectral transmissivity which can be achieved for a dichroic coating with a 0° and a 45° incidence angle (in each case in glass)

In FIG. 3, the curve path 5 shows the transmissivity for a given dichroic coating, in an arrangement with a 0° incidence angle. In this case there is no separation of the light according to different directions of polarization. Arranging the same dichroic coating at an angle of 45° in glass to the direction of the incident light produces the curves 6 and 7 as practical embodiments of the ideal curves shown in FIG. 1.

It can be seen that the curves 6 and 7 in FIG. 3 have the desired properties in the useful range between 450 and 600 nm.

Figure 4:
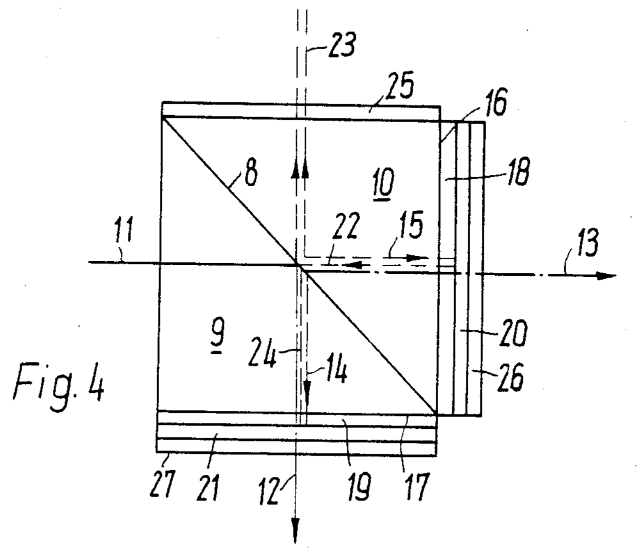
FIG. 4 shows a preferred embodiment of the beam splitting prism system.

In a preferred embodiment of a beam splitting prism system according to the invention, as shown in FIG. 4, the dichroic coating 8 is arranged between the two part prisms 9 and 10. The coating 8 has the properties of the coatings shown in FIG. 1 or FIG. 3. Coating 8 is reflective for light in the blue spectral region and is transmissive for light in the red spectral region. The incident light 11 is therefore divided by the coating 8 into a blue light beam 12 and a red light beam 13. The light in the green spectral region is split into two partial beams 14 and 15, depending on the orientation of the polarization plane.

Arranged at the two output faces 16 and 17 of the beam splitting system are double refractive coatings 18 and 19 with the properties of quarter-wave plates, with respect to the wave length of the green light beam. Arranged on the doubly refractive coating 18 is a dichroic coating 20 which reflects light in the green spectral region and transmits light in the red spectral region.

The green partial light beam 15 therefore is reflected by the dichroic coating 20 and, as it passes for the second time through the doubly refractive coating 18, is reversed in polarization in such a way that it is reflected, as the green partial light beam 22, by the dichroic coating 8, and deflected to the green partial light beam 23.

The green partial light beam 14 is reflected by the dichroic coating 20, which is reflective for light in the green spectral region and transmissive for light in the blue spectral region. The green partial light beam 14 is reversed in polarization at its second passage through the doubly refractive coating 19 in such a way that the green partial light beam 24 is transmitted by the dichroic coating 8, and, together with the partial beam 23, provides the total green light beam. Correction filters 25, 26 and 27 at the three output faces of the beam splitting system possibly provide for filtering out of undesired spectral regions.

When using a dichroic coating 8 with properties as illustrated in FIG. 2, the dichroic coatings 20 and 21 and the correction filters 26 and 27 of the two output faces 16 and 17 must be interchanged. The mode of operation of the beam splitting prism system is otherwise the same.

Figure 5:
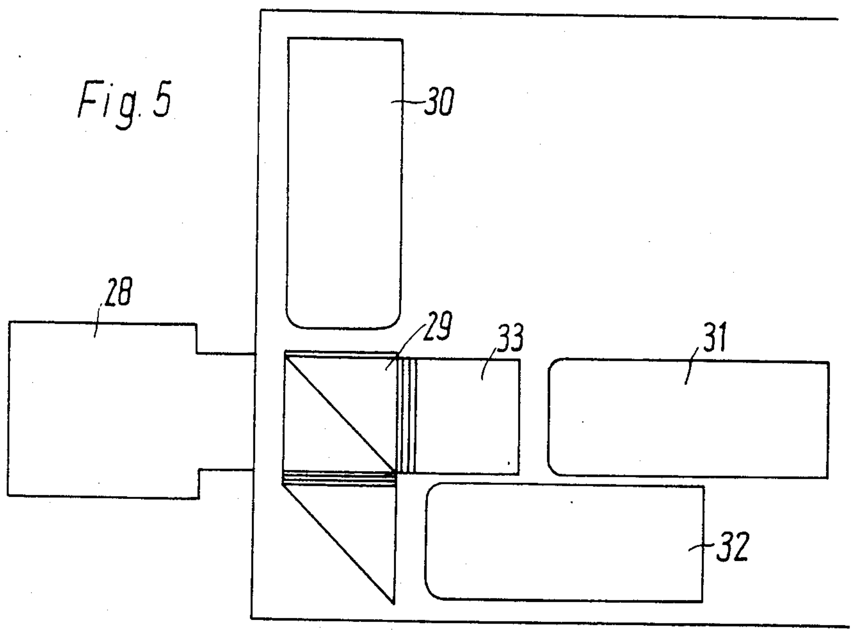
FIG. 5 shows a diagrammatic view of an arrangement given by way of example of a beam splitting prism system according to the invention in a color camera.

FIG. 5 is a diagrammatic illustration of the arrangement of a beam splitting prism system in a color television camera. In this arrangement, the light from a lens 28 is passed to the beam splitting prism system 29 and is divided into three partial light beams. The three storage tubes, 30 for the green, 31 for the red and 32 for the blue, can be grouped in an extremely compact manner directly around the beam splitting system. In this arrangement, the deflecting prism takes over the compensation of the glass-traversing paths for blue. Only for the red tube 31 is a glass body 33 necessary for compensating the glass-traversing paths.

While the invention has been particularly shown and described with reference to a preferred embodiment thereof, it will be understood by those skilled in the art that various changes in form and details may be made therein without departing from the spirit and scope of the invention.

What is claimed is:

1. A beam splitting prism system for a color television device for splitting an incident light beam into partial light beams in each of a first, second, and third of three different spectral regions, comprising:

A. first and second beam splitting prisms, each forming an identical isosceles right triangle in cross-section, each triangle being formed by first and second faces of equal given lengths and a longer third face of the respective prism, B. a first dichroic coating situated between and optically adjacent to the third face of both prisms, whereby the prisms are placed to form a square in cross-section, with the respective first faces on opposite sides of the square and with the respective second faces on the other opposite sides of the square, C. means for providing light from all spectral regions to the first face of the first prism, D. a first doubly refractive coating optically adjacent to the second face of the first prism, E. a second dichroic coating optically adjacent to the first doubly refractive coating on the side of the first doubly refractive coating remote from the first prism, F. a second doubly refractive coating optically adjacent to the first face of the second prism, G. a third dichroic coating optically adjacent to the second doubly refractive coating on the side of the second doubly refractive coating remote from the second prism, wherein the first dichroic coating comprises means for transmitting light in a first spectral region to the first face of the second prism, for reflecting light in a second spectral region to the second face of the first prism, and for transmitting a first part of the light in the third spectral region to the first face of the second prism and for reflecting the remaining second part of the light in the third spectral region to the second face of the first prism depending on the orientation of a polarization plane of the incident light relative to an incident plane, whereby substantially all of the light from all three spectal regions reaches either the first face of the second prism or the second face of the first prism by traversing the prism system via a path equal to said given length.

wherein the first doubly refractive coating and the second dichroic coating comprise means for transmitting the light in the second spectral region out from the second face of the first prism and for reflecting the second part of the light in the third spectral region to and out from the second face of the second prism, and wherein the second doubly refractive coating and the third dichroic coating comprise means for transmitting the light in the first spectral region out from the first face of the second prism and for reflecting the first part of the light in the third spectral region to the first dichroic coating, which in turn reflects said first part to and out from the second face of the second prism, whereby both the first part and the second part of the light in the third spectral region reach the second face of the second prism after passing along a path equal to twice said given length.

2. A system according to claim 1 wherein the first spectral region is the region comprising red light, the second spectral region is the region comprising blue light, and the third spectral region is the region comprising green light.

3. A system according to claim 1 wherein the first spectral region is the region comprising blue light, the second spectral region is the region comprising red light, and the third spectral region is the region comprising green light.

4. A system according to claim 1 wherein the first and second doubly refractive coatings each comprise a quarter-wave plate with respect to a wavelength of light in the green spectral region.

* * * * *